US012770897B2

(12) United States Patent
Park

(10) Patent No.: US 12,770,897 B2
(45) Date of Patent: Oct. 20, 2026

(54) FUEL CELL SYSTEM AND CONTROL METHOD THEREOF

(71) Applicants: Hyundai Motor Company, Seoul (KR); Kia Corporation, Seoul (KR)

(72) Inventor: Min Gu Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 659 days.

(21) Appl. No.: 18/135,419

(22) Filed: Apr. 17, 2023

(65) Prior Publication Data

US 2024/0136549 A1 Apr. 25, 2024

(30) Foreign Application Priority Data

Oct. 6, 2022 (KR) ........................ 10-2022-0128005

(51) Int. Cl.
*H01M 8/04228* (2016.01)
*H01M 8/04082* (2016.01)
(Continued)

(52) U.S. Cl.
CPC ... *H01M 8/04089* (2013.01); *H01M 8/04197* (2016.02); *H01M 8/04201* (2013.01);
(Continued)

(58) Field of Classification Search
CPC ......... H01M 8/04228; H01M 8/04303; H01M 8/04395; H01M 8/0438; H01M 8/04197; H01M 8/04089; H01M 8/04201
See application file for complete search history.

(56) References Cited

U.S. PATENT DOCUMENTS

2014/0205926 A1* 7/2014 Yamanaka ........ H01M 8/04302
429/446
2015/0162629 A1* 6/2015 Tomita .............. H01M 8/04529
429/413
(Continued)

FOREIGN PATENT DOCUMENTS

JP 07272738 A * 10/1995 .......... H01M 8/0271
JP 2017157386 A * 9/2017
(Continued)

OTHER PUBLICATIONS

JP 2017157386 translation plus original (Year: 2017).*

*Primary Examiner* — Jeremiah R Smith
(74) *Attorney, Agent, or Firm* — Morgan, Lewis & Bockius LLP

(57) ABSTRACT

A fuel cell system and a control method thereof include an air supply line supplying air to a fuel cell stack and an air discharge line discharging post-reaction air, a stack pressure sensor provided in the air supply line to measure pressure of air at an inlet side of the stack supplied to a cathode side of the fuel cell stack, an air cutoff valve provided with a bypass line connecting the air supply line and the air discharge line in the air cutoff valve, and a controller electrically connected to the stack pressure sensor and the air cutoff valve and configured to determine pressurization time and pressurization torque for the air cutoff valve when the controller concludes that it is necessary to shut off air inside a cathode and control the stack pressure sensor and the air cutoff valve according to the determined pressurization time and the determined pressurization torque so that inside of the cathode is airtight even after stopping of a fuel cell in the fuel cell stack is completed.

6 Claims, 6 Drawing Sheets

(51) Int. Cl.

| | |
|---|---|
| ***H01M 8/04089*** | (2016.01) |
| ***H01M 8/04303*** | (2016.01) |
| ***H01M 8/0438*** | (2016.01) |
| ***H01M 8/2465*** | (2016.01) |

(52) U.S. Cl.

CPC ... *H01M 8/04228* (2016.02); *H01M 8/04303* (2016.02); *H01M 8/0438* (2013.01); *H01M 8/04395* (2013.01); *H01M 8/2465* (2013.01)

(56) References Cited

U.S. PATENT DOCUMENTS

| | | | | |
|---|---|---|---|---|
| 2016/0049672 | A1* | 2/2016 | Tomita .............. | H01M 8/04738<br>429/446 |
| 2018/0375127 | A1* | 12/2018 | Yamazaki ......... | H01M 8/04753 |
| 2022/0271310 | A1* | 8/2022 | Farnsworth ....... | H01M 8/04089 |

FOREIGN PATENT DOCUMENTS

| | | | |
|---|---|---|---|
| JP | 6391625 | B2 | 9/2018 |
| JP | 2020-080261 | A | 5/2020 |
| JP | 2021-120918 | A | 8/2021 |
| KR | 10-1836624 | B1 | 3/2018 |

* cited by examiner

<$O_2$ Cross-Over (Cathode→Anode)>

| category | stack inlet pressure($P_{stkIn}$) | stack outlet pressure($P_{stkOut}$) |
|---|---|---|
| ACV open (during fuel cell operation) | $P_{stkin}$ = AP10sensor value | $P_{stkOut} = P_{stkin} - C_d(Re)\frac{\dot{m}^2_{stk\_in}}{p_{stk\_in}}$ |
| ACV close (during fuel cell stop) | $P_{stkin}$ = AP10sensor value | $P_{stkin}$ = AP10sensor value |

FUEL CELL SYSTEM AND CONTROL METHOD THEREOF

CROSS REFERENCE TO RELATED APPLICATION

The present application claims priority to Korean Patent Application No. 10-2022-0128005, filed Oct. 6, 2022, the entire contents of which is incorporated herein for all purposes by this reference.

BACKGROUND OF THE PRESENT DISCLOSURE

FIELD OF THE PRESENT DISCLOSURE

The present disclosure relates to a fuel cell system and a control method thereof, and more particularly, to a fuel cell system and a control method thereof configured for controlling a stack pressure sensor and an air cutoff valve so that airtightness of a fuel cell stack is maintained even after a fuel cell stops.

DESCRIPTION OF RELATED ART

A fuel cell is a device that receives a supply of hydrogen and air from the outside thereof and generates electricity through an electrochemical reaction that takes place inside a fuel cell stack. The fuel cell may be used as a power source for driving a motor of eco-friendly vehicles such as fuel cell electric vehicles (FCEVs).

A fuel cell electric vehicle includes: a fuel cell stack in which a plurality of fuel cells used as power sources are stacked; a fuel supply system that supplies hydrogen as fuel to the fuel cell stack; an air supply system that supplies oxygen, an oxidizing agent required for electrochemical reactions; and a thermal management system using coolant, etc. to control the temperature of the fuel cell stack.

The fuel supply system depressurizes compressed hydrogen inside a hydrogen tank and supplies it to an anode (fuel electrode) of the fuel cell stack, while the air supply system operates an air compressor to supply the introduced external air to a cathode (air electrode) of the fuel cell stack.

Oxygen contained in the air fed to the cathode and hydrogen fed to the anode are combined to generate electricity through an electrochemical reaction. By-products of the reaction (generated water (water), high-temperature heat generated by the electrochemical reaction, etc.) and exhaust gases (unreacted hydrogen and oxygen, etc.) are discharged to the outside of the vehicle through an air discharge line.

When a typical fuel cell stops after operation is completed, it may be impossible to maintain the airtightness of an air cutoff valve (ACV). This will be described with reference to FIG. 1.

FIG. 1 is a graph showing pressures, hydrogen concentrations, and discharged hydrogen concentrations on anode and cathode sides when a typical fuel cell stops.

In the situation of FIG. 1, after the fuel cell is operated ($t_0$~$t_1$), the stop process of the fuel cell starts ($t_1$). At the instant time, the air cutoff valve on the cathode side is blocked, and hydrogen migrates from the anode to the cathode because of the partial pressure difference due to the high hydrogen concentration in the anode. At the instant time, a controller maintains a close command to the air cutoff valve. Accordingly, when the fuel cell stops, the pressure of the cathode gradually increases and continues to increase, reaching a point ($t_1$~$t_2$) in time when the pressure in the cathode exceeds atmospheric pressure (101 kPa). When the stopping of the fuel cell is completed, a power supply to the fuel cell is cut off and the air cutoff valve may not receive the close command. Because of this, the air cutoff valve is unable to keep the airtightness of the cathode, the durability of the stack may deteriorate due to hydrogen exhaust and air inflow in the stack, and excessive concentration of hydrogen may be released into the exhaust. When the stopping of the fuel cell is completed ($t_2$), a positive pressure exceeding atmospheric pressure is formed in the cathode and the airtightness is broken, and the pressure in the cathode drops by about 4 kPa from 119 kPa to 115 kPa. As a result, hydrogen is discharged to the side of the air cutoff valve and the hydrogen concentration in the exhaust gas rapidly increases ($t_2$~$t_3$).

That is why it is common to press and control the air cutoff valve with a constant pressurization time and pressurization torque derived from test results to maintain airtightness in the stack after the stopping of the fuel cell is completed.

However, when the derived pressurization time and pressurization torque are excessive, a battery of the vehicle may be discharged because of dark current. On the other hand, when the derived pressurization time and pressurization torque are insufficient, airtightness by the air cutoff valve is not maintained, which may cause deterioration of the stack and adversely affect durability.

Accordingly, there is a demand for a solution for maintaining the airtightness of the fuel cell stack according to changes in atmospheric pressure, external temperature, and hydrogen supply pressure by appropriately and variably controlling the pressurization time and the pressurization torque for the air cutoff valve.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell system and a control method thereof configured for maintaining airtightness of a fuel cell stack by appropriately and variably controlling pressurization time and pressurization torque for an air cutoff valve even after a fuel cell stops, increasing the hydrogen supply pressure in the stack to prevent deterioration of the stack and improve initial output responsiveness.

Objectives of the present disclosure are not limited to the ones mentioned above, and other different objectives not mentioned herein will be clearly understood by those skilled in the art from the following description.

In various aspects of the present disclosures, according to various exemplary embodiments of the present disclosure, there is provided a fuel cell system, including: an air supply line supplying air to a fuel cell stack and an air discharge line discharging post-reaction air to an outside of the fuel cell system; a stack pressure sensor provided in the air supply line to measure pressure of air at an inlet side of the stack supplied to a cathode side of the fuel cell stack; an air cutoff valve provided with a bypass line connecting the air supply line and the air discharge line in the air cutoff valve; and a controller electrically connected to the stack pressure sensor and the air cutoff valve and configured to determine pressurization time and pressurization torque for the air cutoff valve when the controller concludes that it is necessary to shut off air inside a cathode and control the stack pressure sensor and the air cutoff valve according to the determined pressurization time and the determined pressurization torque so that inside of the cathode is airtight even after stopping of a fuel cell in the fuel cell stack is completed.

For example, a case where the air inside the cathode needs to be shut off may be when a pressure of the air on the cathode side exceeds atmospheric pressure.

For example, the controller may be configured to determine an outlet air pressure of the stack based on the pressure of the air at the inlet side of the stack supplied to the cathode measured by the stack pressure sensor.

For example, the controller may be configured to determine the pressurization time based on a change amount in the determined outlet air pressure and a value obtained by subtracting atmospheric pressure from the determined outlet air pressure.

For example, the controller may be configured to determine the pressurization torque based on a value obtained by subtracting atmospheric pressure from the determined outlet air pressure.

For example, the controller may be configured to determine whether the value obtained by subtracting the atmospheric pressure from the determined outlet air pressure exceeds a predetermined reference value, and according to a result determined, may decide how long to maintain a maximum value of the pressurization torque.

For example, the controller is configured to receive the outlet air pressure of the stack and atmospheric pressure after the stopping of the fuel cell is completed, and correct the determined pressurization time and the determined pressurization torque based on the outlet air pressure of the stack and atmospheric pressure received.

For example, the controller may be configured to control the air cutoff valve so that an opening angle of the air cutoff valve is adjusted according to the determined pressurization time and the determined pressurization torque.

In various aspects of the present disclosures, according to various exemplary embodiments of the present disclosure, there is provided a method of controlling a fuel cell system including an air supply line supplying air to a fuel cell stack, and an air discharge line discharging post-reaction air to an outside, a stack pressure sensor provided in the air supply line to measure pressure of air at an inlet side of the stack supplied to a cathode side of the fuel cell stack, and an air cutoff valve provided with a bypass line connecting the air supply line and the air discharge line in the air cutoff valve. The control method includes: determining, by a controller, pressurization time and pressurization torque for the air cutoff valve when it is necessary to block air inside a cathode; and controlling the stack pressure sensor and the air cutoff valve according to the determined pressurization time and the determined pressurization torque by the controller so that the inside of the cathode is airtight even after stopping of a fuel cell in the fuel cell stack is completed.

For example, the control method may further include: determining, by the controller, an outlet air pressure of the stack based on the pressure of the air at the inlet side of the stack supplied to the cathode side measured by the stack pressure sensor.

For example, in the determining of the pressurization time, the controller may be configured to determine the pressurization time based on a change amount in the determined outlet air pressure and a value obtained by subtracting atmospheric pressure from the determined outlet air pressure.

For example, in the determining of the pressurization torque, the controller may be configured to determine the pressurization torque based on a value obtained by subtracting atmospheric pressure from the determined outlet air pressure.

For example, the control method may further include: determining, by the controller, whether a value obtained by subtracting the atmospheric pressure from the determined outlet air pressure exceeds a predetermined reference value; and deciding, by the controller, how long to maintain a maximum value of the pressurization torque according to a result determined.

For example, the control method may further include: receiving, by the controller, the outlet air pressure of the stack and atmospheric pressure after the stopping of the fuel cell is completed; and correcting, by the controller, the determined pressurization time and the determined pressurization torque based on the outlet air pressure of the stack and the atmospheric pressure received.

For example, in the controlling the air cutoff valve, the air cutoff valve may be controlled so that an opening angle of the air cutoff valve is adjusted according to the determined pressurization time and the determined pressurization torque.

As described above, according to a fuel cell system and a control method of the present disclosure, it is possible to maintain airtightness of a fuel cell stack by appropriately and variably controlling pressurization time and pressurization torque for an air cutoff valve even after a fuel cell stops, increasing the hydrogen supply pressure in the stack to prevent deterioration of the stack and improve an initial output responsiveness.

Furthermore, regarding the pressurization time and the pressurization torque for the air cutoff valve, tuning man-hours may be reduced because a stack pressure sensor may be used, and system efficiency may be improved because active control is possible according to the surrounding environment such as atmospheric pressure.

Effects obtainable from the present disclosure are not limited to the above-mentioned effects. Other unmentioned effects will be clearly understood by those skilled in the art to which an exemplary embodiment of the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
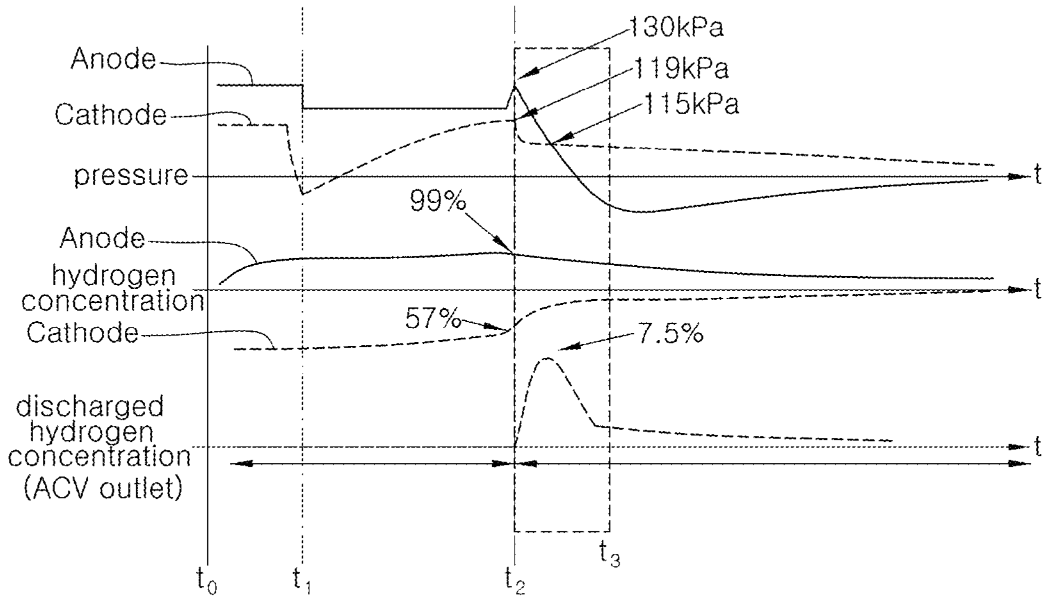
FIG. 1 is a graph showing pressures, hydrogen concentrations, and discharged hydrogen concentrations on anode and cathode sides when a typical fuel cell stops.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, with the same or similar elements being assigned the same reference numerals regardless of numerals used in the drawings, and overlapping descriptions thereof will be omitted.

The suffixes “module” and “part” for the elements used in the following description are provided or mixed in consideration of only the ease of writing the specification, and do not have distinct meanings or roles by themselves.

In describing the exemplary embodiments included in the present specification, if it is determined that detailed descriptions of related known technologies may obscure the gist of the exemplary embodiments included in the present specification, the detailed description thereof will be omitted. Furthermore, it should be understood that the accompanying drawings are only for easy understanding of the exemplary embodiments included in the present specification, and the technical idea included in the present specification is not limited by the accompanying drawings, and the present disclosure covers all changes, equivalents and substitutes within the spirit and scope of the present disclosure. Terms including an ordinal number, such as first, second, etc., may be used to describe various elements, but the elements are not limited by the terms. These terms are used only for distinguishing one element from another.

When an element is referred to as being “connected” to another element, it should be understood that the other element may be directly connected to the other element, but other element(s) may exist in between. On the other hand, when it is said that a certain element is “directly connected” to another element, it should be understood that no other element is present in the middle.

The singular expression includes the plural expression unless the context clearly dictates otherwise.

In the present specification, the terms “comprise”, “include”, or “have” are intended to indicate that there is a feature, number, step, action, element, part, or combination thereof described on the specification, and it is to be understood that the present disclosure does not exclude the possibility of the presence or the addition of one or more other features, numbers, steps, actions, elements, parts, or combinations thereof.

Furthermore, a “unit” or “control unit” included in the names of a motor control unit (MCU), a hybrid control unit (HCU), etc. is only a term widely used in naming a controller that is configured to control a specific vehicle function, and does not mean a generic function unit.

The controller may include a communication device that communicates with other controllers or sensors to control the functions in charge, an operating system, a memory that stores logic commands and input/output information, and one or more processors that perform judgments, calculations, decisions, etc. necessary to control the functions in charge.

Prior to describing the present disclosure, a reason for increasing an anode-side hydrogen pressure when a fuel cell stops will be described first to help the understanding of the present disclosure.

In general, in case of the fuel cell stop, a target pressure for hydrogen supply is increased to secure the hydrogen concentration in a stack. This is because when the hydrogen concentration in the stack is not secured, responsiveness to an initial output may be reduced, and there is a risk of stack voltage reversal or stack deterioration due to residual oxygen. The hydrogen pressure upward range on the anode side may be determined by test evaluation within the scope of complying with regulations on the exhaust concentration of hydrogen gas while considering the durability of a membrane electrode assembly (MEA) of the stack. At the instant time, the supplied hydrogen is consumed by the electrochemical reaction of the remaining hydrogen and air in the stack when airtightness is secured by the air cutoff valve. Thus, because the anode and cathode pressures are formed to be equal and formed at a negative pressure compared to the atmospheric pressure (101 kPa) on the cathode side, the air cutoff valve may maintain the closed state.

Meanwhile, when the target pressure for hydrogen supply on the anode side is raised, the deterioration of the stack and the initial response delay may be prevented by securing the hydrogen concentration. However, it is difficult to maintain the durability of the membrane electrode assembly and comply with the regulations on the exhaust concentration of hydrogen gas due to excessive hydrogen pressure.

Hereinafter, the cause of the voltage reversal and deterioration of the stack when the airtightness by the air cutoff valve is not maintained will be described with reference to FIG. 2.

Figure 2:
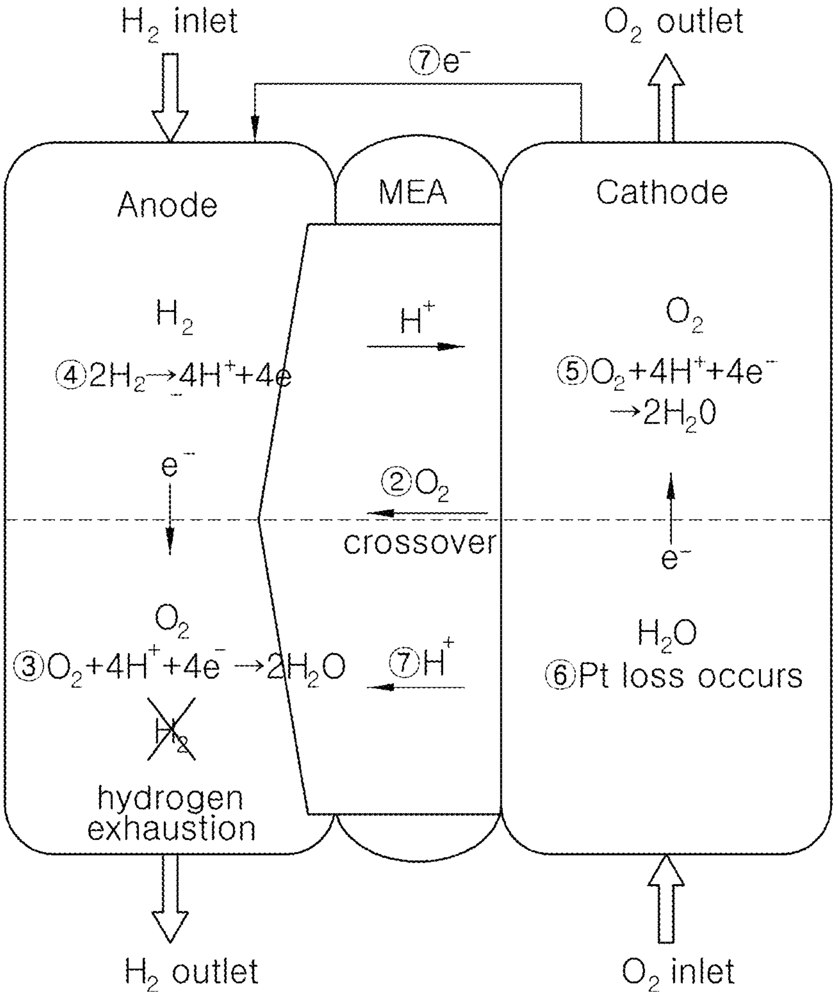
FIG. 2 is a view showing a phenomenon of oxygen crossover when airtightness by an air cutoff valve is not maintained due to a typical stop of a fuel cell.

FIG. 2 is a view showing a phenomenon of oxygen crossover when airtightness by an air cutoff valve is not maintained due to a typical stop of a fuel cell.

Referring to FIG. 2, hydrogen supply is cut off when the fuel cell is stopped. At the instant time, the remaining hydrogen and oxygen on the cathode side react to produce water (H2O), and air is continuously introduced in a state where airtightness by the air cutoff valve is not properly achieved, and oxygen (O2) passes through the membrane electrode assembly and crosses over to the anode. On the anode side, residual hydrogen and crossed-over oxygen on the cathode side react with each other to generate water ($H_2O$). As a result, the anode and cathode are occupied by oxygen due to the continuous inflow of air.

Thereafter, when the fuel cell is started, hydrogen is decomposed at the hydrogen inlet side of the anode to which hydrogen is supplied to generate hydrogen atoms (H f) and electrons (e). At the oxygen outlet side of the cathode, hydrogen atoms and electrons supplied from the anode and oxygen react to produce water ($H_2O$). Due to the provided configuration, as the amount of water produced is excessive, the platinum (Pt) catalyst is lost due to the reaction with the support (C), and water decomposes to produce hydrogen atoms ($H^+$) and electrons ($e^-$). Hydrogen atoms ($H^+$) and electrons ($e^-$) generated at the cathode migrate to the anode, and stack voltage reversal occurs.

In the present context, the fuel cell system according to an exemplary embodiment of the present disclosure is provided as a solution for maintaining the airtightness of the fuel cell stack according to changes in atmospheric pressure, external temperature, and hydrogen supply pressure by appropriately and variably controlling the pressurization time and the pressurization torque for the air cutoff valve.

Figure 3:
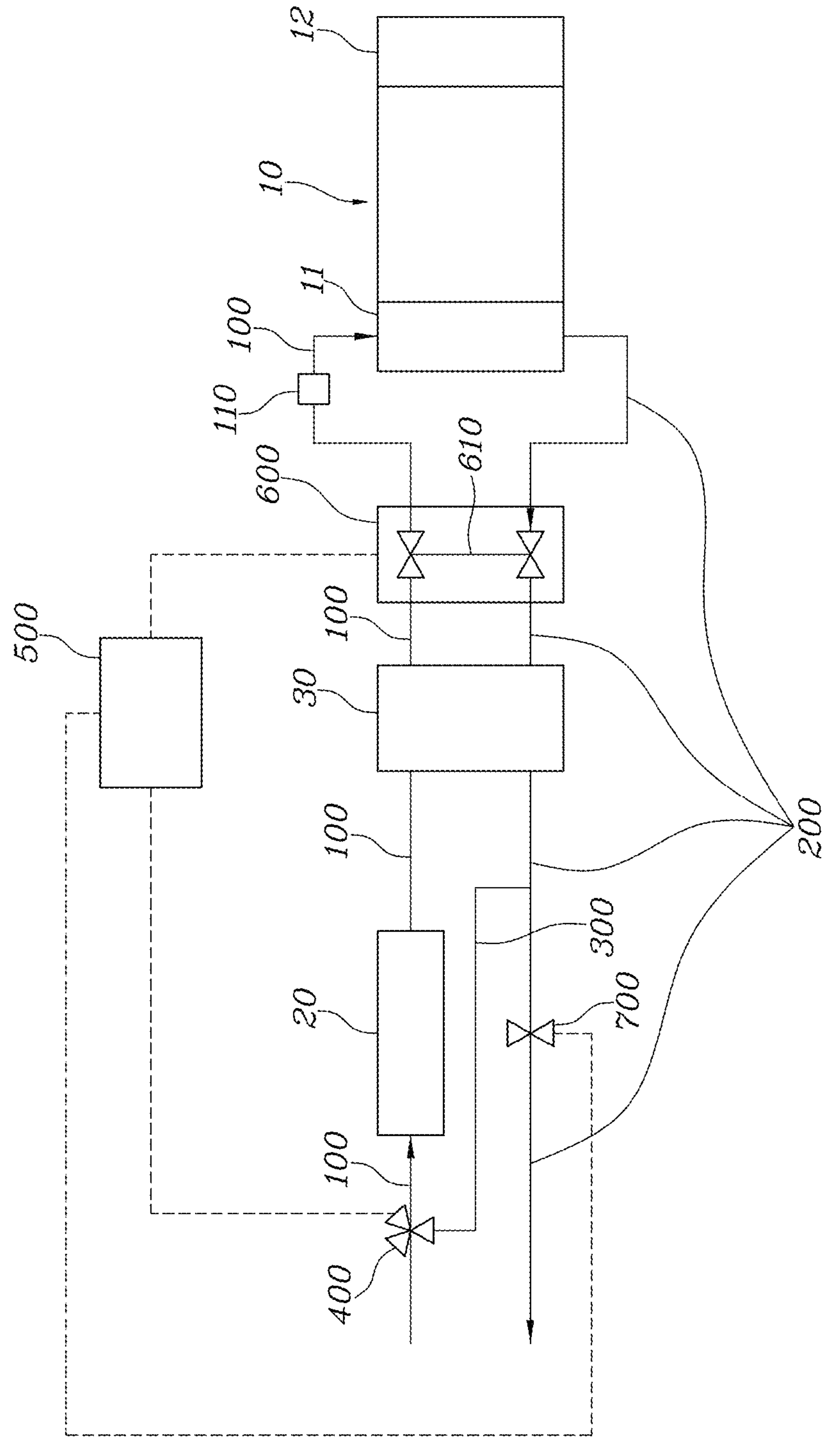
FIG. 3 is a view showing a fuel cell system according to various exemplary embodiments of the present disclosure.
Figure 4:
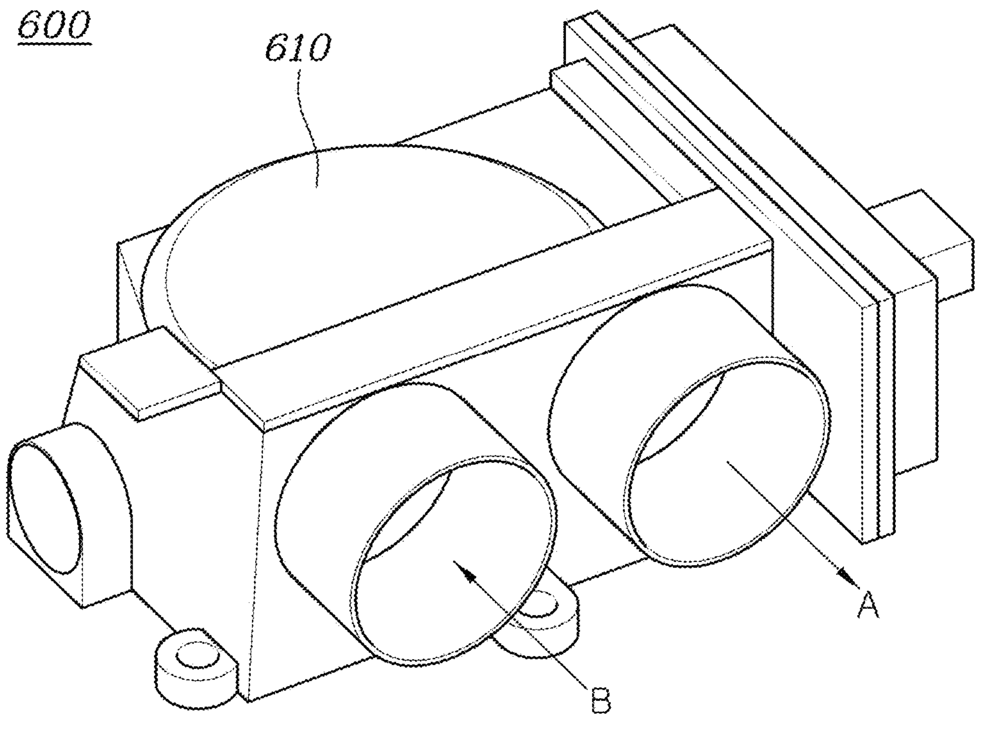
FIG. 4 is a view showing the air cutoff valve of the fuel cell system according to the exemplary embodiment of the present disclosure.

FIG. 3 is a view showing a fuel cell system according to various exemplary embodiments of the present disclosure, and FIG. 4 is a view showing the air cutoff valve of the fuel cell system according to the exemplary embodiment of the present disclosure.

FIG. 3 mainly shows components related to the exemplary embodiment, and in actual implementation of the fuel cell system, fewer or more components may be included in the system. To help the understanding of the present disclosure, the configuration of a typical fuel cell system and a conventional control method for controlling the same will be briefly reviewed, and the different characteristics of each component and step of the present disclosure will be described together.

A typical fuel cell system includes: a fuel cell stack 10 in which a plurality of fuel cells are stacked; a fuel supply system that supplies hydrogen used as fuel to an anode 12 of the fuel cell stack 10; and an air supply system that supplies oxygen necessary for an electrochemical reaction to a cathode 11 of the fuel cell stack 10.

The air supply system includes: an air supply line 100 for supplying air to the cathode 11 of the fuel cell stack 10; and an air discharge line 200 for discharging post-reaction air passed through the cathode 11 to the outside. Accordingly, the fuel cell system according to an exemplary embodiment of the present disclosure has the air supply line 100 and the air discharge line 200 as basic components.

Referring to FIG. 3, the air supply line 100 is provided with an air compressor 20 for drawing the external air supplied to the cathode 11 of the fuel cell stack 10. A humidifier 30 and an air cutoff valve 600 are provided over both the air supply line 100 and the air discharge line 200. An air discharge valve 700 is provided in the air discharge line 200 to control the flow rate of the post-reaction air discharged through an exhaust port after passing through the humidifier 30. Furthermore, a stack pressure sensor 110 is provided in the air supply line 100 to measure the inlet air pressure of the stack supplied to the cathode 11 side thereof.

In the fuel cell, because moisture acts as a transfer medium for hydrogen ions, it is necessary to humidify the air supplied to the cathode 11 with appropriate moisture. Thus, it is necessary to humidify the external air drawn in by the air compressor 20 through the humidifier 30 before being supplied to the cathode 11.

For reference, the humidifier 30 is generally formed with a membrane through which moisture may permeate therein. Based on the present membrane, the inside is called a lumen side and the outside is called a shell side thereof. The air flowing into the humidifier 30 through the air supply line 100 passes through the lumen side, and the air reintroduced into the humidifier 30 through the air discharge line 200 flows into the shell side thereof. The air reintroduced into the humidifier 30 through the air discharge line 200 includes a small amount of moisture generated by operation of the fuel cell stack 10. As the present moisture permeates from the shell side to the lumen side, the air introduced into the humidifier 30 through the air supply line 100 is humidified.

In other words, due to the present operating principle, the humidifier 30 is provided over both the air supply line 100 and the air discharge line 200.

The air cutoff valve 600 may be provided in each of the air supply line 100 and the air discharge line 200 separately, or may be formed to have a flow path A connected to the air supply line 100 and a flow path B connected to the air discharge line 200 at the same time as shown in FIG. 3.

In the latter case, because the air cutoff valve 600 is provided in the air supply line 100 and the air discharge line 200 at the same time, modularization of each component of the fuel cell system is facilitated, and the production cost may be reduced. Therefore, the air cutoff valve 600 is formed as shown in FIG. 4. FIG. 3 shows a state in which the air cutoff valve 600 formed as shown in FIG. 4 is applied.

Meanwhile, oxygen contained in the air fed to the cathode 11 and hydrogen fed to the anode 12 are combined to generate electricity through an electrochemical reaction. Water and high-temperature heat are generated as by-products of the reaction, and the present water and high-temperature heat may be discharged to the outside of the vehicle through the air discharge line 200 with exhaust gases (unreacted hydrogen and oxygen, etc.).

A controller 500 forming the fuel cell system according to an exemplary embodiment of the present disclosure may control the stack pressure sensor 110 and determine the pressurization time and the pressurization torque for the air cutoff valve 600 according to the received pressure when it is necessary to block the air inside the cathode 11. At the instant time, the case where it is necessary to block the air inside the cathode 11 may be a case in which it is difficult for the air cutoff valve to maintain airtightness after the pressure inside the cathode 11 exceeds the atmospheric pressure (101 kPa). Here, the atmospheric pressure may be measured in real time by an atmospheric pressure sensor in the controller 500.

In an exemplary embodiment of the present invention, the air cutoff valve 600 is provided with a bypass line 610 connecting the air supply line 100 and the air discharge line 200 in the air cutoff valve 600.

Figures 5, 6:
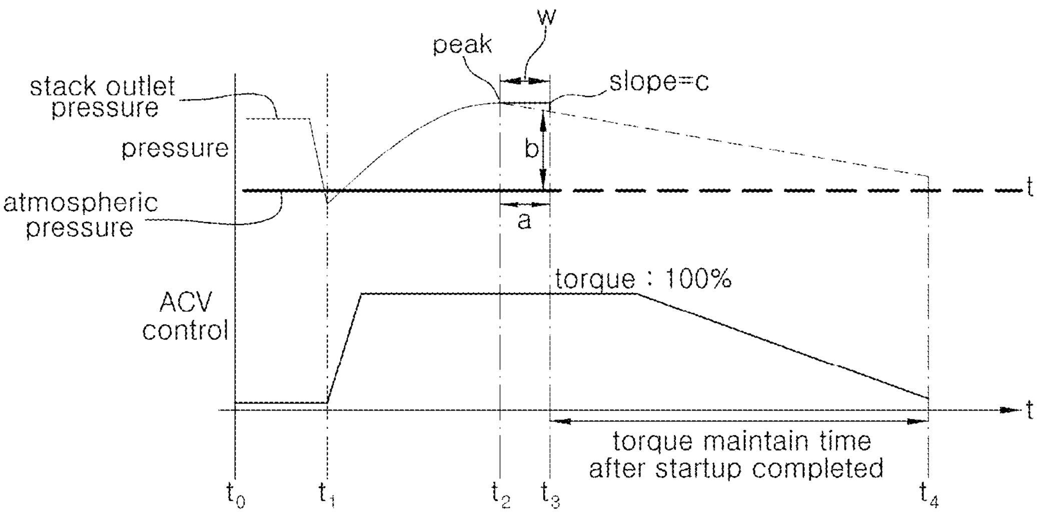
FIG. 5 is a table showing an inlet pressure and outlet pressure of a stack according to the open or closed state of the air cutoff valve according to the exemplary embodiment of the present disclosure.
FIG. 6 is a graph showing control of the air cutoff valve by a controller when the fuel cell is stopped according to the exemplary embodiment of the present disclosure.

FIG. 5 is a table showing an inlet pressure and outlet pressure of the stack 10 according to the open or closed state of the air cutoff valve according to the exemplary embodiment of the present disclosure.

Referring to FIG. 5, the controller 500 may be configured to determine the outlet air pressure of the stack 10 based on the inlet air pressure of the stack 10 supplied to the cathode 11 measured by the stack pressure sensor 110. Because the stack pressure sensor 110 is configured to measure the inlet air pressure of the stack 10, the outlet air pressure of the stack 10 may be estimated according to the open or closed state of the air cutoff valve.

For example, when the air cutoff valve is closed while the fuel cell is stopped, the outlet pressure ($P_{stk\_Out}$) of the stack 10 is equal to the inlet pressure ($P_{stk\_in}$) because no flow occurs due to the closing of the air cutoff valve. On the other hand, when the air cutoff valve is open during fuel cell operation, the outlet pressure ($P_{stk\_Out}$) of the stack 10 is different from the inlet pressure ($P_{stk\_in}$). To be specific, based on the in-pipe flow theory (Bernoulli obstruction theory), the outlet pressure ($P_{stk\_Out}$) of the stack 10 may be determined as a value obtained by subtracting the following term from the inlet pressure ($P_{stk\_in}$).

$$C_d(\mathrm{Re}) - \frac{\dot{m}^2_{stk\_in}}{\rho_{stk\_in}}(\mathrm{Re} = \text{Reynolds number},$$

$$C_d = \text{discharge coefficient},\ m = \text{inlet head},\ q = \text{fluid density})$$

FIG. 6 is a graph showing control of the air cutoff valve by the controller 500 when the fuel cell is stopped according to the exemplary embodiment of the present disclosure.

Referring to FIG. 6, the controller 500 may control a motor in the air cutoff valve to adjust the opening angle of the air cutoff valve so that the inside of the cathode 11 is airtight according to the pressurization time and pressurization torque. At the instant time, the controller 500 may be a fuel cell control unit (FCU) 500 which is configured to emit hydrogen to the fuel cell by controlling a supply/block valve of hydrogen according to circumstances. The controller 500 may transmit the air pressure and atmospheric pressure at the outlet side of the stack 10 to the air cutoff valve through the controller area network (CAN) communication. After the stopping of the fuel cell is started, the pressure at the outlet side of the stack 10 gradually increases until the stop is completed ($t_1$~$t_2$), and when the stopping of the fuel cell is completed, the pressure on the outlet side of the stack 10 becomes the maximum ($t_2$).

Thereafter, through the control of the air cutoff valve by the controller 500, the pressure on the outlet side of the stack 10 gradually decreases in a form of a linear function without a sharp drop section ($t_2$~$t_4$). At the instant time, in the sleep mode, the controller 500 is unable to receive pressure information from the stack pressure sensor 110 ($t_1$~$t_2$). Thus, the pressurization time and the pressurization torque are inevitably determined based on the linear function graph before the controller 500 enters the sleep mode. Therefore, looking at the section ($t_2$~$t_3$), the slope is c, the change amount in the air pressure at the outlet is a, and the value obtained by subtracting the atmospheric pressure from the air pressure at the outlet is b. Accordingly, when the linear function is expressed as an equation with $t_2$ as the y-axis and atmospheric pressure as the x-axis, it may be expressed as $y=-c*x+(a*c+b)$. Thus, the point at which the outlet pressure of the stack 10 becomes equal to the atmospheric pressure is $t_4$, which is a point at which y=0, and ($t_3$~$t_4$) may be expressed as b/a. Accordingly, the controller 500 may be configured to determine b/a as the pressurization time. Furthermore, the controller 500 is configured to determine whether a value obtained by subtracting the atmospheric pressure from the determined outlet air pressure exceeds a predetermined reference value, and decide how long to maintain the maximum value of the pressurization torque according to the determination result. For example, as shown in FIG. 6, when b, which is a value obtained by subtracting the atmospheric pressure from the determined outlet air pressure based on $t_3$, exceeds the predetermined reference value of 20 kPa, the controller 500 is configured to control to maintain the maximum value of the pressurization torque, and when b becomes 20 kPa or less, the controller may be configured to control the pressurization torque to decrease in a form of a linear function.

Furthermore, the controller 500 may be configured to determine the pressurization torque based on a value obtained by subtracting the atmospheric pressure from the determined outlet air pressure. As b, which is the value obtained by subtracting atmospheric pressure from the determined outlet air pressure, is larger, the torque required for pressurizing the air cutoff valve increases, so that the controller 500 may be configured to determine the pressurization torque for the air cutoff valve to be large. As b is smaller, the torque required for pressurizing the air cutoff valve decreases, so that the controller 500 may be configured to determine the pressurization torque for the air cutoff valve to be small.

Moreover, the controller 500 may receive the air pressure and atmospheric pressure at the outlet side of the stack 10 after the stopping of the fuel cell is completed. This is to allow the controller 500 to receive the air pressure and atmospheric pressure at the outlet side of the stack 10 for about 3 minutes after the stopping of the fuel cell is completed and before the controller 500 enters the sleep mode to correct the pressurization time and the pressurization torque because the pressurization time and the pressurization torque required for the stack 10 airtightness may be changed depending on the external environment and the state of the stack 10.

A method of controlling a fuel cell system according to an exemplary embodiment based on the above-described configuration of the fuel cell system will be described with reference to FIG. 7.

Figure 7:
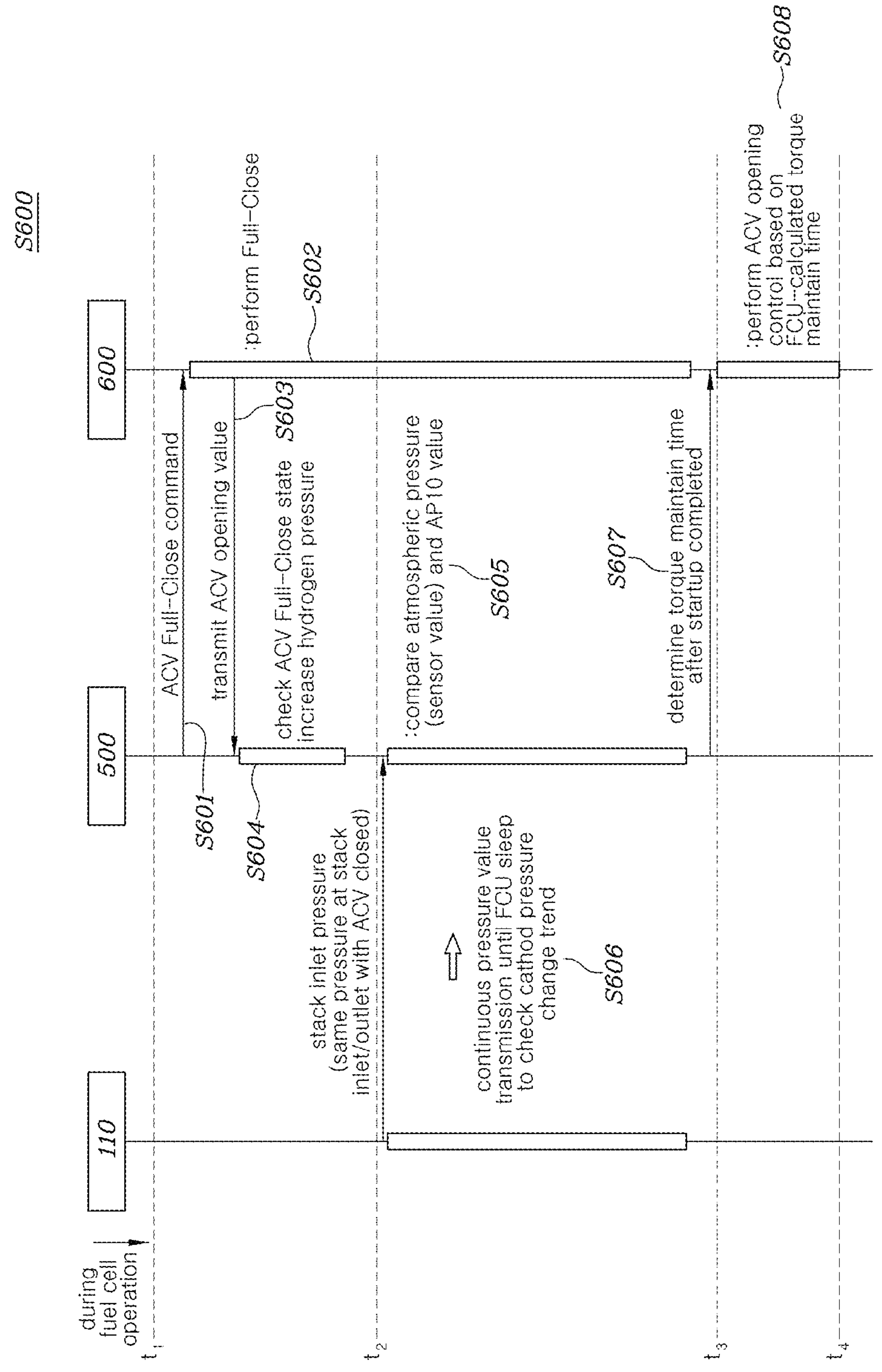
FIG. 7 is a view showing a control process of the fuel cell system according to the exemplary embodiment of the present disclosure.

FIG. 7 is a flowchart (S600) showing a control process of the fuel cell system according to the exemplary embodiment of the present disclosure.

Referring to FIG. 7, first, from the start of the fuel cell operation stop to completion ($t_1$~$t_2$), the controller 500 may control the air cutoff valve to be completely closed (S601). The air cutoff valve is pressed to be closed completely after receiving the control command (S602). The controller 500 receives an opening value from the air cutoff valve (S603), checks the closed state of the air cutoff valve, and increases the hydrogen supply pressure (S604). Thereafter, the controller 500 may receive an outlet pressure value of the stack 10 from the stack pressure sensor 110. When the stopping of the fuel cell is completed, the pressure on the outlet side of the stack 10 becomes maximum ($t_2$), and at the instant time, as it is necessary to block the air inside the cathode 11, the controller 500 is configured to control the air cutoff valve so that the inside of the cathode 11 is airtight according to the determined pressurization time and pressurization torque (S605) even after the stopping of the fuel cell is completed. The controller 500 may receive the outlet pressure value from the stack pressure sensor 110 until the controller 500 enters the sleep mode to check the pressure change trend on the cathode 11 side (S606). Thereafter, the controller 500 may control the stack pressure sensor 110 to determine the pressurization time and the pressurization torque for the air cutoff valve according to the received pressure. The controller 500 may be configured to determine whether a value obtained by subtracting the atmospheric pressure from the determined outlet air pressure exceeds a predetermined reference value, and decide how long to maintain the maximum value of the pressurization torque according to the determination result (S607). After the controller 500 enters the sleep mode, the air cutoff valve may be controlled according to the determined pressurization time and the determined pressurization torque by the controller 500 (S608).

According to the exemplary embodiments of the present disclosure described so far, it is possible to maintain airtightness of a fuel cell stack by appropriately and variably controlling pressurization time and pressurization torque for an air cutoff valve even after a fuel cell stops, increasing the hydrogen supply pressure in the stack to prevent deterioration of the stack and improve an initial output responsiveness. Furthermore, regarding the pressurization time and the pressurization torque for the air cutoff valve, tuning manhours may be reduced because a stack pressure sensor may be used, and system efficiency may be improved because active control is possible according to the surrounding environment such as atmospheric pressure.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell system, comprising:

an air supply line supplying air to a fuel cell stack, and an air discharge line discharging post-reaction air to an outside of the fuel cell system;

a stack pressure sensor provided in the air supply line to measure pressure of the air at an inlet side of the fuel cell stack, wherein the air is supplied to a cathode of the fuel cell stack;

an air cutoff valve provided with a bypass line connecting the air supply line and the air discharge line in the air cutoff valve and operated by a motor; and a controller electrically connected to the stack pressure sensor and the air cutoff valve, and configured to determine pressurization time and a torque for the motor of the air cutoff valve based on that the controller concludes that shutting off the air inside the cathode of the fuel cell stack is required, stop a fuel cell in the fuel cell stack and then control the motor by applying the determined torque for the determined pressurization time after stopping of the fuel cell so that an opening angle of the air cutoff valve is maintained even after stopping of the fuel cell is completed, wherein the controller is configured to compare a pressure of the air on the cathode side and atmospheric pressure, and conclude that the air inside the cathode needs to be shut off when the pressure of the air on the cathode side exceeds the atmospheric pressure, wherein the controller is configured to determine an outlet air pressure of the fuel cell stack based on a pressure of the air at the inlet side of the fuel cell stack supplied to the cathode measured by the stack pressure sensor, wherein the controller is configured to determine the torque based on a value obtained by subtracting the atmospheric pressure from the determined outlet air pressure, and wherein the controller is configured to determine whether the value obtained by subtracting the atmospheric pressure from the determined outlet air pressure exceeds a predetermined reference value, and according to a result of the determining whether the value obtained by subtracting the atmospheric pressure from the determined outlet air pressure exceeds the predetermined reference value, configured to determine how long to maintain a maximum value of the torque.

2. The fuel cell system of claim 1, wherein the controller is configured to determine the pressurization time based on a change amount in the determined outlet air pressure and the value obtained by subtracting the atmospheric pressure from the determined outlet air pressure.

3. The fuel cell system of claim 1, wherein the controller is configured to receive the outlet air pressure of the fuel cell stack and the atmospheric pressure after the stopping of the fuel cell is completed, and to correct the determined pressurization time and the determined torque based on the received outlet air pressure of the fuel cell stack and the received atmospheric pressure.

4. A method of controlling a fuel cell system including an air supply line supplying air to a fuel cell stack, and an air discharge line discharging post-reaction air to an outside of the fuel cell system, a stack pressure sensor provided in the air supply line to measure pressure of the air at an inlet side of the fuel cell stack, wherein the air is supplied to a cathode of the fuel cell stack, and an air cutoff valve provided with a bypass line connecting the air supply line and the air discharge line in the air cutoff valve and operated by a motor of the air cutoff valve, the method comprising:

determining, by a controller electrically connected to the stack pressure sensor and the air cutoff valve, pressurization time and a torque for the motor based on that shutting off the air inside the cathode of the fuel cell stack is required; and after the determining, controlling, by the controller, the motor according to the determined pressurization time and the determined torque after stopping of a fuel cell in the fuel cell stack so that an opening angle of the air cutoff valve is maintained even after stopping of the fuel cell is completed, wherein the method further includes determining, by the controller, an outlet air pressure of the fuel cell stack based on a pressure of the air at the inlet side of the fuel cell stack supplied to the cathode measured by the stack pressure sensor, wherein in the determining of the torque, the controller is configured to determine the torque based on a value obtained by subtracting atmospheric pressure from the determined outlet air pressure, wherein the method further includes:

determining, by the controller, whether the value obtained by subtracting the atmospheric pressure from the determined outlet air pressure exceeds a predetermined reference value; and deciding, by the controller, how long to maintain a maximum value of the torque according to a result of the determining of whether the value obtained by subtracting the atmospheric pressure from the determined outlet air pressure exceeds the predetermined reference value.

5. The method of claim 4, wherein in the determining of the pressurization time, the controller is configured to determine the pressurization time based on a change amount in the determined outlet air pressure and the value obtained by subtracting the atmospheric pressure from the determined outlet air pressure.

6. The method of claim 4, further including:

receiving, by the controller, the outlet air pressure of the fuel cell stack and atmospheric pressure after the stopping of the fuel cell is completed; and correcting, by the controller, the determined pressurization time and the determined torque based on the received outlet air pressure of the fuel cell stack and the received atmospheric pressure received.

* * * * *